P. ROTONDO.
PIVOTAL POT HANDLE.
APPLICATION FILED OCT. 6, 1909.
948,187.
Patented Feb. 1, 1910.
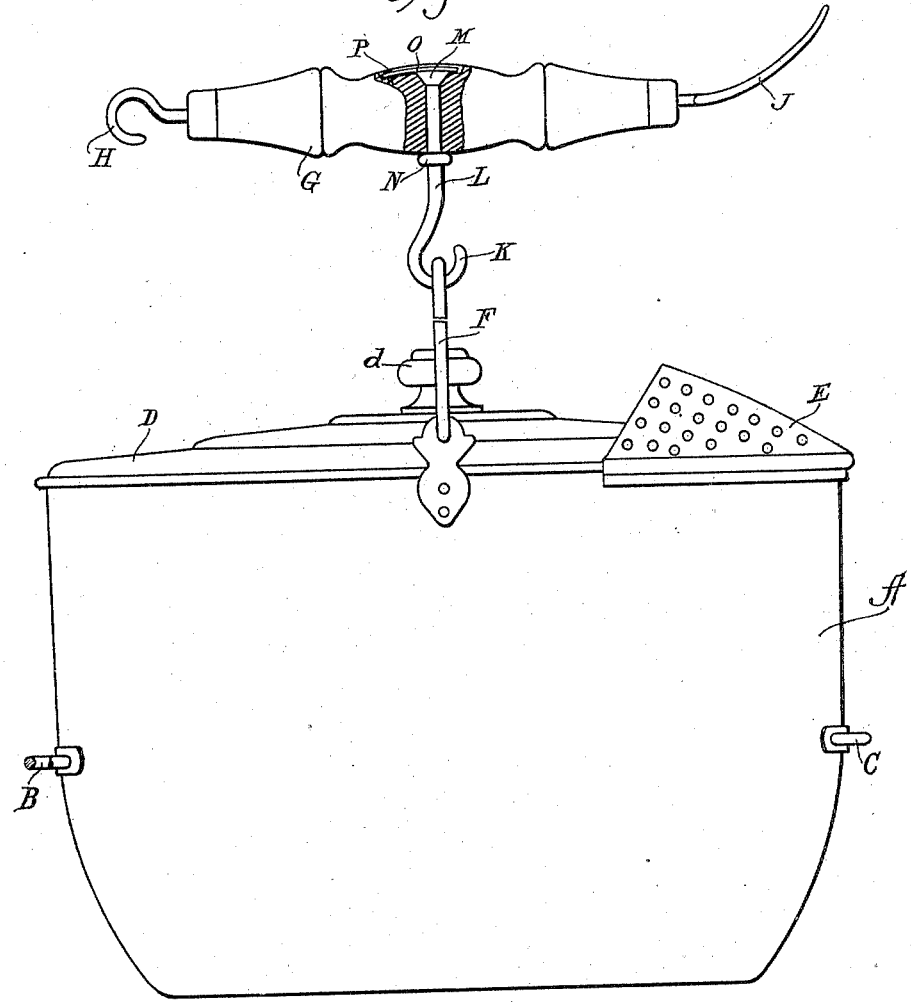
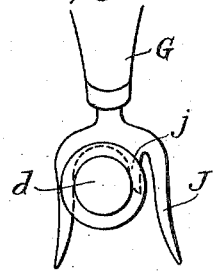
Witnesses
B. J. Crawford
R. C. Balinger
Inventor
Peter Rotondo,
By Edwin Guthrie,
Attorney

UNITED STATES PATENT OFFICE.

PETER ROTONDO, OF NEW YORK, N. Y.

PIVOTAL POT-HANDLE.

948,187.

Specification of Letters Patent.  Patented Feb. 1, 1910.

Application filed October 6, 1909. Serial No. 521,330.

*To all whom it may concern:*

Be it known that I, PETER ROTONDO, citizen of the United States, residing at New York, in the county of New York and State of New York, have invented certain new and useful Improvements in Pivotal Pot-Handles, of which the following is a specification.

This invention relates to pivotal pot handles, and has for its object the production of a handle for the lifting of a pot or other vessel provided with a bail, but more particularly intended for use in manipulating pots upon a stove and containing boiling food substances, as for example, macaroni, spaghetti, or vegetables.

In further explanation of the purpose and use of this invention, it may be stated that where the pot itself is of considerable size and is well filled with the substances undergoing the cooking operation and necessarily covered with boiling water, it requires the exertion of some strength to lift, or to lift and turn the pot upon the stove, or to otherwise manipulate the same. Often the pot cannot be touched by the hand and some implement is necessary for the purpose.

The construction of this invention is set forth in the accompanying drawings, of which—

Figure 1 represents a side view illustrating a handle made in accordance with this invention, and showing the same having its lifting hook engaged with the bail of a pot. Fig. 2 is a top plan view of the fork at one end of the handle and mentioned in the description of this invention as given herein.

While this invention may be employed with any vessel provided with a bail, it is especially adapted for use in handling pots such as pot A in the drawing. The pot A is constructed with staples B on one side and C on the opposite side, projecting from the external surface of the pot. The pot has a cover D and the cover has a knob *d* by which it may be lifted. A strainer E is attached at one side of the pot upon the edge thereof as shown. The bail of the pot is designated by the letter F.

The handle shown in Fig. 1 and made in accordance with this invention is marked G. At one end the handle is provided with a projecting hook H, and at the opposite end the fork J is located.

The bail F of the pot A is supported by the hook K, and the shank L of the hook passes upwardly through the handle G as illustrated. At the top the shank L has a head M, and it is obvious that in the construction of this invention and assembling its parts, the hook K is fashioned after the shank from which it is formed has been passed through the handle. The shank is movable in the handle. The head M prevents it from being drawn through the handle by the weight of the pot, and the collar N on the shank immediately below the handle holds it in position against displacement upwardly.

It will now be understood that the pot A suspended from hook K may be turned in either direction, the shank L turning in the handle which may remain stationary. To limit or control any momentum the pot may acquire about its axis, there is provided a brake plate O lying immediately above the head M of shank L, and secured to the handle G by the pin P. The pressure of a finger upon the brake plate subjects the head of the shank to friction and the shank, hook, and pot are brought to rest as desired.

The fork J besides being available for any appropriate culinary operation, is constructed for the purpose of lifting the cover D by passing it beneath the knob *d*, as shown in Fig. 2. One of the tines *j* of the fork J is shorter than the outside tines, and the fork will engage the necks of knobs of different sizes.

There are various uses to which this invention may be applied in manipulating a pot. By way of setting forth the operation of this invention, it should here be explained that in practice it is customary to have a pair of handles constructed in accordance with this invention. Let it be assumed that the pot A contained a quantity of food substances and boiling water, and that it was desirable to drain off a portion or all the water. The pot would be lifted with one of the pair of handles, and tilted by causing the hook H of the other handle to engage staple B of the pot, the cover D having first been removed as explained. If it is desired to empty the contents of the pot, it is turned by the extra handle until it reaches the proper position whereupon it is stopped by pressing the brake plate O down upon the head M of the shank L, the resulting friction bringing the rotating pot to rest. The hook H of the extra handle is caused to engage staple C and to tilt the pot to empty it. It will be understood that during the operations of draining and emptying the pot, the hand lifting the pot need not be turned at all.

Having now described this invention, and explained its mode of operation, what I claim is:—

1. A pot handle, comprising a handle having a hook adapted for lifting a vessel by its bail, the said hook having a shank passing movably through the handle, means constructed and arranged to hold the shank in the handle against displacement lengthwise, and a brake device adapted to act upon the said shank and to control the rotary movement of said shank.

2. A handle, comprising a handle having a hook adapted for lifting a vessel by its bail, the said hook having a shank passing movably through the handle, means constructed and arranged to hold the shank in the handle consisting of a head on the end of the shank whereby the shank is prevented from being drawn out of the handle by the weight of the pot, and a brake device arranged to act upon the said head of the shank to control the rotary movement of the said shank.

In testimony whereof I affix my signature in presence of two witnesses.

PETER ROTONDO.

Witnesses:
 DOMENICK A. MONTANI,
 ROCCO A. MONTANI.